(12) United States Patent
Takatsu et al.

(10) Patent No.: US 10,622,847 B2
(45) Date of Patent: Apr. 14, 2020

(54) WIRELESS POWER SUPPLY SYSTEM

(71) Applicant: IHI CORPORATION, Tokyo (JP)

(72) Inventors: Yuji Takatsu, Tokyo (JP); Akio Ueda, Tokyo (JP); Motonao Niizuma, Tokyo (JP); Kei Akune, Tokyo (JP); Tooru Hayashi, Tokyo (JP); Akihiko Tsuchiyama, Tokyo (JP); Kazushi Sedokubo, Tokyo (JP); Masaki Kawakita, Tokyo (JP); Mai Kanda, Tokyo (JP); Gongwei Li, Tokyo (JP); Ryota Kokubu, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/172,372

(22) Filed: Oct. 26, 2018

(65) Prior Publication Data

US 2019/0068007 A1 Feb. 28, 2019

Related U.S. Application Data

(60) Division of application No. 14/924,934, filed on Oct. 28, 2015, now abandoned, which is a continuation of
(Continued)

(30) Foreign Application Priority Data

Jul. 18, 2013 (JP) .................................. 2013-149931

(51) Int. Cl.
*H02J 50/10* (2016.01)
*H02J 50/90* (2016.01)
(Continued)

(52) U.S. Cl.
CPC .............. *H02J 50/90* (2016.02); *B60L 53/12* (2019.02); *B60L 53/38* (2019.02); *B60L 53/51* (2019.02);
(Continued)

(58) Field of Classification Search
CPC .. H02J 50/90; H02J 50/10; H02J 50/40; H02J 5/005; H02J 17/00; H02J 50/12;
(Continued)

(56) References Cited

U.S. PATENT DOCUMENTS 8,035,255 B2 10/2011 Kurs et al.
8,106,539 B2 1/2012 Schatz et al.
(Continued)

FOREIGN PATENT DOCUMENTS

CN 102959823 A 3/2013
JP 62-122435 U 8/1987
(Continued)

OTHER PUBLICATIONS

International Search Report, PCT/JP2014/067114, dated Sep. 9, 2014, 2 pages.

*Primary Examiner* — Jung Kim
(74) *Attorney, Agent, or Firm* — Volpe and Koenig, P.C.

(57) ABSTRACT

A wireless power supply system includes: a primary power-supplying coil which is a power-supplying coil capable of wirelessly supplying electric power to another power-supplying coil; a first machine that supports the primary power-supplying coil; a secondary power-supplying coil which is a power-supplying coil wirelessly supplied with electric power from another power-supplying coil; and a second machine that can move while supporting the secondary power-supplying coil. The relative positional relationship or the relative attitudinal relationship between the first machine and the second machine can be adjusted corresponding to the movement or change in attitude of the second machine so that a state in which electric power is wirelessly supplied from the primary power-supplying coil to the secondary power-supplying coil is maintained.

1 Claim, 7 Drawing Sheets

Related U.S. Application Data application No. PCT/JP2014/067114, filed on Jun. 27, 2014.

(51) Int. Cl.
*H02J 50/40* (2016.01)
*B60L 53/12* (2019.01)
*B60L 53/51* (2019.01)
*B60L 53/60* (2019.01)
*B60L 53/38* (2019.01)
*H02J 50/12* (2016.01)

(52) U.S. Cl.
CPC ............ *B60L 53/60* (2019.02); *H02J 50/10* (2016.02); *H02J 50/40* (2016.02); *B60L 2200/10* (2013.01); *B60L 2200/32* (2013.01); *B60L 2200/40* (2013.01); *H02J 50/12* (2016.02); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC .......... B60L 53/51; B60L 53/60; B60L 53/38; B60L 53/12; B60L 2200/40; B60L 2200/32; B60L 2200/10; Y02T 90/122; Y02T 90/128; Y02T 90/14; Y02T 90/121; Y02T 90/163; Y02T 90/125; Y02T 10/7005; Y02T 10/7088
See application file for complete search history.

(56) References Cited

U.S. PATENT DOCUMENTS

| | | |
|---|---|---|
| 2003/0214255 A1 | 11/2003 | Baarman et al. |
| 2010/0201316 A1 | 8/2010 | Takada |
| 2010/0217353 A1 | 8/2010 | Forsell |
| 2013/0049481 A1 | 2/2013 | Kudo et al. |
| 2013/0093259 A1 | 4/2013 | Hente et al. |
| 2014/0232200 A1 | 8/2014 | Maekawa |
| 2015/0364930 A1 | 12/2015 | Hente et al. |
| 2017/0080815 A1 | 3/2017 | Wechsler |

FOREIGN PATENT DOCUMENTS

| | | | | |
|---|---|---|---|---|
| JP | 02-032721 A | 2/1990 | | |
| JP | 2000-092615 A | 3/2000 | | |
| JP | 2005-177065 A | 7/2005 | | |
| JP | 2005-247127 A | 9/2005 | | |
| JP | 2006-523363 A | 10/2006 | | |
| JP | 2009-107394 A | 5/2009 | | |
| JP | 2010-011696 A | 1/2010 | | |
| JP | 2010-288450 A | 12/2010 | | |
| JP | 2011-060260 A | 3/2011 | | |
| JP | 2011-097814 A | 5/2011 | | |
| JP | 2012-157167 A | 8/2012 | | |
| JP | 2012-222975 A | 11/2012 | | |
| JP | 2010-288430 A | 12/2012 | | |
| JP | 2013-005518 A | 1/2013 | | |
| JP | 2013-020589 A | 1/2013 | | |
| JP | 2013-046561 A | 3/2013 | | |
| JP | 2013-051855 A | 3/2013 | | |
| JP | 2013-060262 A | 4/2013 | | |
| JP | 2013060262 A | * | 4/2013 | ............... B66B 1/14 |
| JP | 2013-085467 A | 5/2013 | | |
| JP | 2013-121261 A | 6/2013 | | |
| WO | 2013/085030 A1 | 6/2013 | | |

* cited by examiner

WIRELESS POWER SUPPLY SYSTEM

This application is a continuation application based on a PCT Patent Application No. PCT/JP2014/067114, filed on Jun. 27, 2014, whose priority is claimed on Japanese Patent Application No. 2013-149931, filed on Jul. 18, 2013. The contents of both the PCT application and the Japanese Patent Application are incorporated herein by reference.

TECHNICAL FIELD

The present disclosure relates to a wireless power supply system.

BACKGROUND ART

In recent years, wireless power supply systems, for example, a system in which a source machine wirelessly supplies electric power to a destination machine, have been proposed.

For example, a primary power-supplying coil is provided in the source machine and a secondary power-supplying coil is provided in the destination machine.

It is desirable to wirelessly supply electric power from the primary power-supplying coil to the secondary power-supplying coil with little energy loss FIGS. 11A and 11B illustrate the concept of a wireless power supply system.

FIGS. 11A and 11B are disclosed in U.S. Pat. No. 8,035, 255.

Moreover, when electric power is wirelessly supplied from the primary power-supplying coil to the secondary power-supplying coil, it is desirable that the way to use the system be easy.

DOCUMENT OF RELATED ART

Patent Document

[Patent Document 1] Japanese Unexamined Patent Application, First Publication No. 2011-60260
[Patent Document 2] Japanese Unexamined Patent Application, First Publication No. 2011-97814
[Patent Document 3] Specification of U.S. Pat. No. 8,035, 255
[Patent Document 4] Specification of U.S. Pat. No. 8,106, 539

SUMMARY

Technical Problem

The present disclosure is conceived in view of the above-described circumstances and provides a wireless power supply system which has a simple structure and little energy loss and which can supply electric power in an easy-to-use manner.

Solution to Problem

A wireless power supply system of the present disclosure includes: a primary power-supplying coil which is a power-supplying coil configured to wirelessly supply electric power to another power-supplying coil; a first machine supporting the primary power-supplying coil; a secondary power-supplying coil which is a power-supplying coil wirelessly supplied with electric power from another power-supplying coil; and a second machine supporting the secondary power-supplying coil and configured to move, wherein a relative positional relationship or a relative attitudinal relationship between the first machine and the second machine is capable of being adjusted in response to a movement or a change in attitude of the second machine so that a state in which electric power is wirelessly supplied from the primary power-supplying coil to the secondary power-supplying coil.

Hereinafter, the wireless power supply systems according to embodiments of the present disclosure will be described. The present disclosure includes any one of the embodiments described below or a combination of two or more of the embodiments.

The first machine can adjust the position or attitude of the primary power-supplying coil according to the movement of the second machine in response to a movement or a change in attitude of the second machine so that a state in which electric power is wirelessly supplied from the primary power-supplying coil to the secondary power-supplying coil.

In a wireless power supply system according to an embodiment of the present disclosure, the primary power-supplying coil is supported by the first machine to be configured to wirelessly supply electric power to another power-supplying coil positioned one of below and above the primary power-supplying coil, the secondary power-supplying coil is supported by the second machine to be configured to be wirelessly supplied with electric power from another power-supplying coil positioned the other of above and below the secondary power-supplying coil, the primary power-supplying coil can adjust the relative positional relationship or the relative attitudinal relationship between the first machine and the second machine to be positioned below or above the secondary power-supplying coil, and electric power is wirelessly supplied from the primary power-supplying coil to the secondary power-supplying coil when the primary power-supplying coil is positioned below or above the secondary power-supplying coil.

A wireless power supply system according to an embodiment of the present disclosure includes: a plurality of the primary power-supplying coils; a plurality of the secondary power-supplying coils; a plurality of the first machines; and a plurality of the second machines, wherein the plurality of the second machines respectively support a plurality of load devices supplied with electric power that is wirelessly supplied to the plurality of the secondary power-supplying coils, the plurality of the primary power-supplying coils are respectively supported by the plurality of the first machines to be configured to wirelessly supply electric power to other power-supplying coils positioned one of below and above the primary power-supplying coils, the plurality of the secondary power-supplying coils are respectively supported by the plurality of the second machines to be configured to be wirelessly supplied with electric power from other power-supplying coils positioned the other of above and below the secondary power-supplying coils, relative positional relationships between the plurality of the first machines and the plurality of the second machines are capable of respectively being adjusted in response to movements of the plurality of the second machines so that the plurality of the primary power-supplying coils are respectively positioned below or above the plurality of the secondary power-supplying coils, and electric power is wirelessly supplied from the plurality of the primary power-supplying coils to the plurality of the secondary power-supplying coils respectively and the wirelessly supplied electric power is supplied from the plurality of the secondary power-supplying coils to the plurality of the load devices of the plurality of the second machines respectively.

In a wireless power supply system according to an embodiment of the present disclosure, the first machine is a movable object that can move in the air in a horizontal direction, the primary power-supplying coil is supported by the movable object to be configured to wirelessly supply electric power to another power-supplying coil positioned immediately below the primary power-supplying coil, the second machine is a traveling object that steers and travels in a horizontal direction along a route, the secondary power-supplying coil is supported by the traveling object to be configured to be wirelessly supplied with electric power from another power-supplying coil positioned immediately above the secondary power-supplying coil, and the movable object moves in the horizontal direction so as to follow travel of the traveling object in response to the travel of the traveling object so that the movable object is positioned immediately above the traveling object.

In a wireless power supply system according to an embodiment of the present disclosure, the first machine is a vessel that moves on a water surface, the primary power-supplying coil is supported by the vessel to be configured to wirelessly supply electric power to another power-supplying coil positioned immediately below the primary power-supplying coil, the second machine is an underwater movable object that moves underwater, the secondary power-supplying coil is supported by the underwater movable object to be configured to be wirelessly supplied with electric power from another power-supplying coil positioned immediately above the secondary power-supplying coil, and the vessel moves on the water surface so as to follow movement of the underwater movable object so that the vessel is positioned immediately above the underwater movable object.

In a wireless power supply system according to an embodiment of the present disclosure, the first machine is a crane that downwardly suspends a hoisting attachment, with a cable, the second machine is suspended from the hoisting attachment, the primary power-supplying coil is supported by the crane to be able to wirelessly supply electric power to another power-supplying coil positioned immediately below the primary power-supplying coil, the secondary power-supplying coil is supported by the second machine to be configured to be wirelessly supplied with electric power from another power-supplying coil positioned immediately above the secondary power-supplying coil, and electric power is wirelessly supplied from the primary power-supplying coil to the secondary power-supplying coil during the use of the crane.

In a wireless power supply system according to an embodiment of the present disclosure, the first machine includes a first machine body and a connecting member that connects the first machine body and the second machine, the primary power-supplying coil is guided to freely move along the connecting member, and the primary power-supplying coil is moved along the connecting member so that electric power is wirelessly supplied from the primary power-supplying coil to the secondary power-supplying coil.

In a wireless power supply system according to an embodiment of the present disclosure, the first machine includes a first machine body and a rope that connects the first machine body and the second machine and is configured to be reeled out or reeled in, the primary power-supplying coil is guided to freely move along the rope, and the primary power-supplying coil is moved along the rope so that electric power is wirelessly supplied from the primary power-supplying coil to the secondary power-supplying coil.

In a wireless power supply system according to an embodiment of the present disclosure, the first machine is a crane that downwardly suspends a hoisting attachment with a cable, the second machine is suspended from the hoisting attachment, the primary power-supplying coil is guided to freely move along the cable, and the primary power-supplying coil is moved along the cable so that a state in which electric power is wirelessly supplied from the primary power-supplying coil to the secondary power-supplying coil is maintained.

In a wireless power supply system according to an embodiment of the present disclosure, the first machine is a crane that downwardly suspends a hoisting attachment, whose hook is configured to rotate about a vertical axis, with a cable, the second machine is a machine that causes the hook to rotate about the vertical axis, the primary power-supplying coil is guided to freely move in a vertical direction along the cable, the primary power-supplying coil is moved along the cable so that a state in which electric power is wirelessly supplied from the primary power-supplying coil to the secondary power-supplying coil is maintained, and the second machine causes the hook to rotate about the vertical axis with the electric power wirelessly supplied from the primary power-supplying coil to the secondary power-supplying coil.

A wireless power supply system according to an embodiment of the present disclosure includes: a plurality of the primary power-supplying coils; a plurality of the secondary power-supplying coils; the first machine that supports the plurality of the primary power-supplying coils and a photovoltaic battery that generates electric power from sunlight received by a light-receiving surface and supplies the electric power to the plurality of primary power-supplying coils; and a plurality of the second machines that support the plurality of secondary power-supplying coils, wherein the first machine keeps the light-receiving surface of the photovoltaic battery to facing the sun and changes the attitudes of the plurality of the primary power-supplying coils so as to follow movements of the plurality of the second machines in response to the movements or changes in attitude of the plurality of the second machines so that a state in which the electric power generated by the photovoltaic battery is wirelessly supplied from the plurality of the primary power-supplying coils to the plurality of the secondary power-supplying coils respectively is e maintained.

Effects of the Disclosure

As described above, due to the configuration, the wireless power supply systems according to the embodiments of the present disclosure provide the following effects.

The relative positional relationship or the attitudinal relationship between the first machine and the second machine can be adjusted so that a state in which electric power is wirelessly supplied from the primary power-supplying coil to the secondary power-supplying coil to correspond to the movement of the first machine moving while supporting the primary power-supplying coil is maintained. Thus, it is possible to supply electric power from the first machine to the moving second machine.

Moreover, the position or attitude of the primary power-supplying coil is changed according to the movement of the second machine that supports the secondary power-supplying coil so that a state in which the first machine supports the primary power-supplying coil and electric power is wirelessly supplied from the primary power-supplying coil to the secondary power-supplying coil is maintained. Thus, it is possible to supply electric power from the first machine to the moving second machine.

Further, when the position of the primary power-supplying coil supported by the first machine and the position of the secondary power-supplying coil supported by the second machine are in a vertical relationship, electric power can be wirelessly supplied. Moreover, the primary power-supplying coil and the secondary power-supplying coil can be positioned in a vertical relationship by adjusting the relative positional relationship between the first machine and the second machine. Thus, it is possible to supply electric power from the first machine to the moving second machine.

Further, when the positions of the plurality of primary power-supplying coils supported by the plurality of first machines and the positions of the plurality of secondary power-supplying coils supported by the plurality of second machines are in a vertical relationship, electric power can be wirelessly supplied to the respective coils. Moreover, the plurality of primary power-supplying coils and the plurality of secondary power-supplying coils can be positioned in a vertical relationship by adjusting the relative positional relationship between the plurality of first machines and the plurality of second machines. Thus, it is possible to supply electric power from the plurality of first machines to the plurality of second machines and to supply electric power to the load devices supported by the plurality of second machines.

Further, when the position of the primary power-supplying coil supported by a movable object that can move in the air and the position of the secondary power-supplying coil supported by a traveling object that travels along a route are in a vertical relationship, electric power can be wirelessly supplied. Moreover, the movable object can move in the horizontal direction according to the travel of the traveling object to be positioned immediately above the traveling object to correspond to the travel of the traveling object so that the primary power-supplying coil and the secondary power-supplying coil are positioned in a vertical relationship. Thus, it is possible to supply electric power from the movable object to the moving traveling object.

Moreover, when the position of the primary power-supplying coil supported by a vessel that can move on the water surface and the position of the secondary power-supplying coil supported by an underwater movable object that moves underwater are in a vertical relationship, electric power can be wirelessly supplied. Moreover, the vessel can move in the horizontal direction according to the travel of the underwater movable object to be positioned immediately above the underwater movable object to correspond to the travel of the underwater movable object so that the primary power-supplying coil and the secondary power-supplying coil can be positioned in a vertical relationship. Thus, it is possible to supply electric power from the vessel to the moving underwater movable object.

Further, electric power can be wirelessly supplied when the position of the primary power-supplying coil supported by a crane and the position of the secondary power-supplying coil supported by the first machine that is supported by a lifting tool of the crane are in a vertical relationship. Thus, it is possible to supply electric power to the second machine supported by the lifting tool during the use of the crane.

Further, the primary power-supplying coil is guided to freely move with the connecting member that connects the first machine and the second machine, and the primary power-supplying coil is moved with the connecting member so that electric power can be wirelessly supplied from the primary power-supplying coil to the secondary power-supplying coil. Thus, it is possible to supply electric power from the first machine to the moving second machine.

Further, the secondary power-supplying coil is guided to freely move along the rope that can connect the first machine and the second machine and can be reeled out or in, and the primary power-supplying coil is moved along the rope so that electric power can be wirelessly supplied from the primary power-supplying coil to the secondary power-supplying coil. Thus, it is possible to supply electric power from the first machine to the moving second machine.

Further, the secondary power-supplying coil is guided to freely move along the cable that hoists the lifting tool of the crane and the primary power-supplying coil is moved along the cable so that a state in which electric power is wirelessly supplied from the primary power-supplying coil to the secondary power-supplying coil can be maintained. Thus, it is possible to supply electric power to the second machine suspended from the lifting tool that is lowered from the crane along the cable.

Further, the secondary power-supplying coil is guided to freely move along the cable that hoists the lifting tool of the crane, the primary power-supplying coil is moved along the cable so that a state in which electric power is wirelessly supplied from the primary power-supplying coil to the secondary power-supplying coil is maintained, and the hook of the lifting tool is rotated about the vertical axis with the wirelessly supplied electric power. Thus, it is possible to rotate the hook of the lifting tool lowered from the crane along the cable with the electric power supplied to the second machine.

Further, the first machine changes the attitudes of the plurality of primary power-supplying coils according to the movement of the plurality of second machines so that a state in which the light-receiving surface of the photovoltaic battery faces the sun and the electric power generated by the photovoltaic battery can be wirelessly supplied from the plurality of primary power-supplying coils to the plurality of secondary power-supplying coils is maintained. Thus, it is possible to supply the electric power generated by the photovoltaic battery to the second machine.

Therefore, it is possible to provide a wireless power supply system which has a simple structure and little energy loss and which can supply electric power in an easy-to-use manner.

DESCRIPTION OF EMBODIMENTS

Figure 1A:
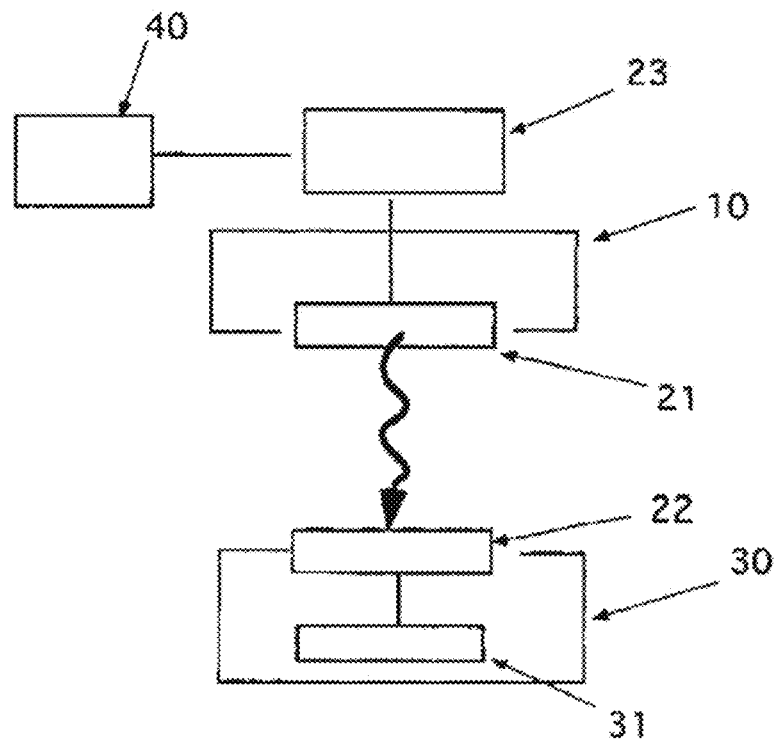
FIG. 1A is a conceptual diagram of a wireless power supply system according to a first embodiment of the present disclosure.

Hereinafter, embodiments according to the present disclosure will be described with reference to the drawings.

First, a wireless power supply system according to an embodiment of the present disclosure will be described based on the drawings.

A wireless power supply system according to an embodiment of the present disclosure is a system which utilizes wireless power transmission.

For example, in a wireless power supply system, electric power output by a power supply device is wirelessly supplied from a primary power-supplying coil driven by a driving circuit to a secondary power-supplying coil and the wirelessly supplied electric power is supplied to a load device.

When a current flows into the primary power-supplying coil, a magnetic field is generated in a space to induce a current in the secondary power-supplying coil present in the magnetic field.

For example, when an AC current flows into the primary power-supplying coil, a magnetic field is generated in the space to induce a current in the secondary power-supplying coil present in the magnetic field.

As a result, the secondary power-supplying coil is wirelessly supplied with electric power from the primary power-supplying coil.

For example, the secondary power-supplying coil is wirelessly supplied with electric power from the primary power-supplying coil according to magnetic field resonance method, electric field resonance method, or electromagnetic induction method.

A wireless power supply system according to an embodiment of the present disclosure includes a primary power-supplying coil, a first machine, a secondary power-supplying coil, and a second machine.

A wireless power supply system according to an embodiment of the present disclosure may include a primary power-supplying coil, a first machine, a secondary power-supplying coil, a second machine, and a driving circuit and may include a primary power-supplying coil, a first machine, a secondary power-supplying coil, a second machine, a driving circuit, and a power supply device.

The primary power-supplying coil is a power-supplying coil that can wirelessly supply electric power to another power-supplying coil.

The first machine supports the primary power-supplying coil.

The secondary power-supplying coil is a power-supplying coil that is wirelessly supplied with electric power from another power-supplying coil.

The second machine can move while supporting the secondary power-supplying coil.

The second machine may support a load device that consumes electric power supplied to the secondary power-supplying coil.

A relative positional relationship or a relative attitudinal relationship between the first and second machines can be adjusted so that a state in which electric power is wirelessly supplied from the primary power-supplying coil to the secondary power-supplying coil to correspond to the movement or change in attitude of the second machine is maintained.

The first machine may be able to adjust the position or attitude of the primary power-supplying coil according to the movement of the second machine so that a state in which electric power is wirelessly supplied from the primary power-supplying coil to the secondary power-supplying coil to correspond to the movement or change in attitude of the second machine is maintained.

The first machine adjusts the position or attitude of the primary power-supplying coil according to the movement of the second machine so that a state in which electric power is wirelessly supplied from the primary power-supplying coil to the secondary power-supplying coil to correspond to the movement or change in attitude of the second machine is maintained, and wirelessly supplies electric power from the primary power-supplying coil to the secondary power-supplying coil.

The first machine may move to be able to adjust the position or attitude of the primary power-supplying coil according to the movement of the second machine so that a state in which electric power is wirelessly supplied from the primary power-supplying coil to the secondary power-supplying coil to correspond to the movement or change in attitude of the second machine is maintained.

The driving circuit is a circuit that drives the primary power-supplying coil.

For example, the driving circuit drives the secondary power-supplying coil so that efficiency of the wireless power transmission from the primary power-supplying coil to the secondary power-supplying coil is improved.

For example, the driving circuit includes a matching circuit and a switching circuit.

The matching circuit is a circuit that adjusts electric characteristic of an electric circuit that includes the primary power-supplying coil and the secondary power-supplying coil.

For example, the matching circuit adjusts frequency characteristic of the electric circuit that includes the primary power-supplying coil and the secondary power-supplying coil to a predetermined value.

The switching circuit chops electric power and supplies a current having a predetermined current value, voltage value, and frequency to the primary power-supplying coil via the matching circuit.

The driving circuit may be controlled by a control device to drive the primary power-supplying coil.

A plurality of driving circuits may drive a plurality of primary power-supplying coils.

The driving circuit may drive a plurality of primary power-supplying coils connected electrically.

The power supply device is a device that supplies electric power to the driving circuit.

The power supply device supplies electric power to the driving circuit, the driving circuit drives the primary power-supplying coil using the supplied electric power, and the electric power is wirelessly supplied from the primary power-supplying coil to the secondary power-supplying coil and is supplied to the load device.

Hereinafter, wireless power supply systems according to a plurality of embodiments of the present disclosure will be described based on the drawings.

First, a wireless power supply system according to a first embodiment of the present disclosure will be described based on the drawings.

Figure 1B:
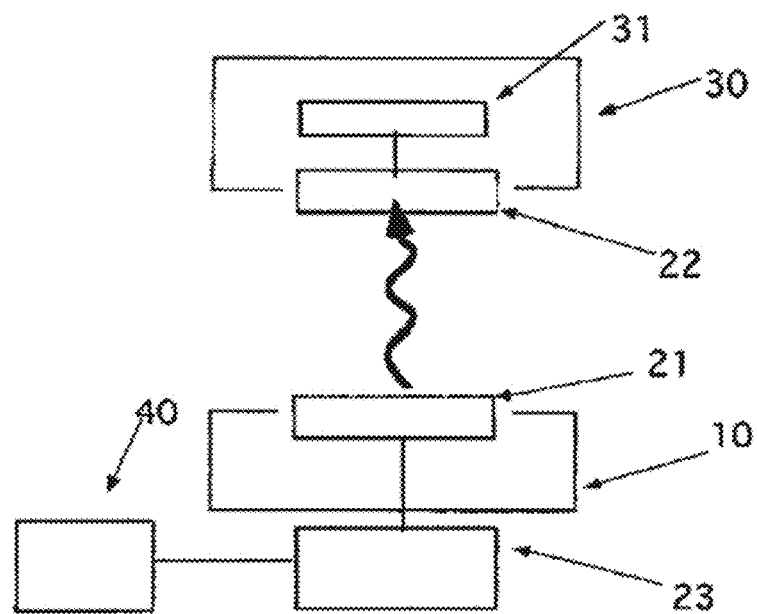
FIG. 1B is a conceptual diagram of the wireless power supply system according to the first embodiment of the present disclosure.

FIGS. 1A and 1B are conceptual diagrams of a wireless power supply system according to a first embodiment of the present disclosure.

A wireless power supply system according to the first embodiment of the present disclosure is a system which utilizes wireless power transmission.

For example, in a wireless power supply system, electric power output by a power supply device 40 is wirelessly supplied from a primary power-supplying coil 21 driven by a driving circuit 23 to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

The secondary power-supplying coil 22 is wirelessly supplied with electric power from the primary power-supplying coil 21 positioned above or below the secondary power-supplying coil 22.

For example, the secondary power-supplying coil 22 is wirelessly supplied with electric power from the primary power-supplying coil 21 according to magnetic field resonance method, electric field resonance method, or electromagnetic induction method.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The primary power-supplying coil 21 is supported by the first machine 10 to be able to wirelessly supply electric power to another power-supplying coil positioned below or above the primary power-supplying coil 21.

The primary power-supplying coil 21 is supported by the first machine 10 to be able to wirelessly supply electric power to the secondary power-supplying coil 22 positioned below or above the primary power-supplying coil 21.

The secondary power-supplying coil 22 is a power-supplying coil that is wirelessly supplied with electric power from another power-supplying coil.

The secondary power-supplying coil 22 is wirelessly supplied with electric power from the primary power-supplying coil 21.

The second machine 30 can move while supporting the secondary power-supplying coil 22.

The secondary power-supplying coil 22 is supported by the second machine 30 to be able to wirelessly supply electric power to another power-supplying coil positioned above or below the secondary power-supplying coil 22.

The secondary power-supplying coil 22 is supported by the second machine 30 to be able to be wirelessly supplied with electric power from the primary power-supplying coil 21 positioned above or below the secondary power-supplying coil 22.

The second machine 30 may support the load device 31 that consumes electric power supplied to the secondary power-supplying coil.

A relative positional relationship or a relative attitudinal relationship between the first machine and the second machine can be adjusted so that a state in which electric power is wirelessly supplied from the primary power-supplying coil to the secondary power-supplying coil to correspond to the movement of the change in attitude of the second machine 30 is maintained.

The relative positional relationship or the relative attitudinal relationship between the first machine 10 and the second machine 30 can be adjusted so that the primary power-supplying coil 21 is positioned below or above the secondary power-supplying coil 22. Moreover, electric power is wirelessly supplied from the primary power-supplying coil 21 to the secondary power-supplying coil 22 when the primary power-supplying coil 21 is positioned below or above the secondary power-supplying coil 22.

The relative positional relationship or the relative attitudinal relationship between the first machine 10 and the second machine 30 can be adjusted so that the primary power-supplying coil 21 is positioned below or above the secondary power-supplying coil 22. Moreover, the driving circuit 23 drives the primary power-supplying coil 21 so that electric power is wirelessly supplied from the primary power-supplying coil 21 to the secondary power-supplying coil 22 when the primary power-supplying coil 21 is positioned below or above the secondary power-supplying coil 22.

FIG. 1A illustrates a state in which the relative positional relationship or the relative attitudinal relationship between the first machine 10 and the second machine 30 can be adjusted so that the primary power-supplying coil 21 is positioned above the secondary power-supplying coil 22 and in which, when the primary power-supplying coil 21 is positioned above the secondary power-supplying coil 22, electric power is wirelessly supplied from the primary power-supplying coil 21 to the secondary power-supplying coil 22 and the wirelessly supplied electric power is supplied to the load device 31.

FIG. 1B illustrates a state in which the relative positional relationship or the relative attitudinal relationship between the first machine 10 and the second machine 30 can be adjusted so that the primary power-supplying coil 21 is positioned below the secondary power-supplying coil 22 and in which, when the primary power-supplying coil 21 is positioned below the secondary power-supplying coil 22, electric power is wirelessly supplied from the primary power-supplying coil 21 to the secondary power-supplying coil 22 and the wirelessly supplied electric power is supplied to the load device 31.

The driving circuit 23 and the power supply device 40 are the same as those of the wireless power supply system according to the above-described embodiment of the present disclosure and description thereof will not be provided.

Next, a wireless power supply system according to a second embodiment of the present disclosure will be described based on the drawings.

Figure 2:
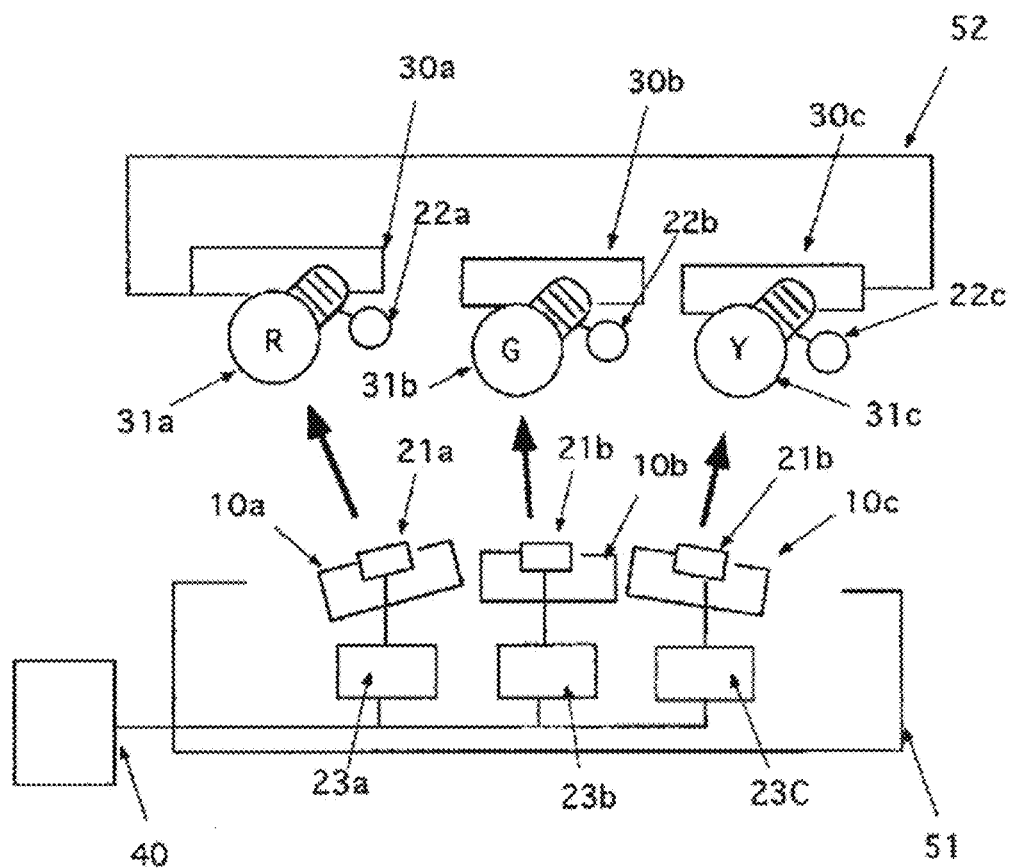
FIG. 2 is a conceptual diagram of a wireless power supply system according to a second embodiment of the present disclosure.

FIG. 2 is a conceptual diagram of a wireless power supply system according to the second embodiment of the present disclosure.

The wireless power supply system according to the second embodiment of the present disclosure is a system which utilizes wireless power transmission.

For example, in a wireless power supply system, electric power output by a power supply device 40 is wirelessly supplied from a plurality of primary power-supplying coils 21a, 21b, and 21c driven by driving circuits 23a, 23b, and 23c, respectively, to a plurality of secondary power-supplying coils 22a, 22b, and 22c, and the wirelessly supplied electric power is supplied to load devices 31a, 31b, and 31c.

When a current flows into the plurality of primary power-supplying coils 21a, 21b, and 21c, a magnetic field is generated in a space to induce a current in the plurality of secondary power-supplying coils 22a, 22b, and 22c present in the magnetic fields.

For example, when an AC current flows into the plurality of primary power-supplying coils 21a, 21b, and 21c, and a magnetic field is generated in a space to induce a current in the secondary power-supplying coils 22a, 22b, and 22c present in the magnetic field.

As a result, the secondary power-supplying coil is wirelessly supplied with electric power from the primary power-supplying coil positioned below the secondary power-supplying coil.

For example, the secondary power-supplying coil 22a, 22b, and 22c are wirelessly supplied with electric power from the primary power-supplying coils 21a, 21b, and 21c according to magnetic field resonance, electric field resonance, or electromagnetic induction.

The wireless power supply system according to the second embodiment of the present disclosure includes the plurality of primary power-supplying coils 21a, 21b, and 21c, a plurality of first machines 10a, 10b, and 10c, the plurality of secondary power-supplying coils 22a, 22b, and 22c, and a plurality of second machines 30a, 30b, and 30c.

The wireless power supply system according to the second embodiment of the present disclosure may include the plurality of primary power-supplying coils 21a, 21b, and 21c, the plurality of first machines 10a, 10b, and 10c, the plurality of secondary power-supplying coils 22a, 22b, and 22c, the plurality of second machines 30a, 30b, and 30c, and the plurality of driving circuits 23a, 23b, and 23c.

The wireless power supply system according to the second embodiment of the present disclosure may include the plurality of primary power-supplying coils 21a, 21b, and 21c, the plurality of first machines 10a, 10b, and 10c, the plurality of secondary power-supplying coils 22a, 22b, and 22c, the plurality of second machines 30a, 30b, and 30c, the plurality of driving circuits 23a, 23b, and 23c, and a power supply device 40.

The wireless power supply system according to the second embodiment of the present disclosure may include the plurality of primary power-supplying coils 21a, 21b, and 21c, the plurality of first machines 10a, 10b, and 10c, the plurality of secondary power-supplying coils 22a, 22b, and 22c, the plurality of second machines 30a, 30b, and 30c, the plurality of driving circuits 23a, 23b, and 23c, the power supply device 40, and frameworks 51 and 52.

The primary power-supplying coils 21a, 21b, and 21c are power-supplying coils that can wirelessly supply electric power to another power-supplying coil.

The primary power-supplying coils 21a, 21b, and 21c can wirelessly supply electric power to the secondary power-supplying coils 22a, 22b, and 22c.

The first machines 10a, 10b, and 10c support the primary power-supplying coils 21a, 21b, and 21c, respectively.

The plurality of primary power-supplying coils 21a, 21b, and 21c are supported by the plurality of first machines 10a, 10b, and 10c, respectively, to be able to wirelessly supply electric power to other power-supplying coils positioned below or above the primary power-supplying coils 21a, 21b, and 21c.

The plurality of primary power-supplying coils 21a, 21b, and 21c are supported by the plurality of first machines 10a, 10b, and 10c, respectively, to be able to wirelessly supply electric power to the secondary power-supplying coils 22a, 22b, and 22c positioned below or above the primary power-supplying coils 21a, 21b, and 21c, respectively.

The first machines 10a, 10b, and 10c can be fixed to the framework 51 that will be described later.

The first machines 10a, 10b, and 10c can be detachably attached to the framework 51 that will be described later, and the attitudes thereof can be adjusted.

The secondary power-supplying coil 22 is a power-supplying coil that is wirelessly supplied with electric power from another power-supplying coil.

The secondary power-supplying coil 22 is wirelessly supplied with electric power from the primary power-supplying coil 21.

The second machines 30a, 30b, and 30c can move while supporting the secondary power-supplying coils 22a, 22b, and 22c, respectively.

The second machines 30a, 30b, and 30c may support the load devices 31a, 31b, and 31c, respectively, that consume the electric power supplied to the secondary power-supplying coil.

The load devices 31a, 31b, and 31c are supplied with the electric power wirelessly supplied to the plurality of secondary power-supplying coils 22a, 22b, and 22c, respectively.

The plurality of secondary power-supplying coils 22a, 22b, and 22c are supported by the plurality of second machines 30a, 30b, and 30c, respectively, to be able to be wirelessly supplied with electric power from other power-supplying coils positioned above or below the secondary power-supplying coils 22a, 22b, and 22c, respectively.

The plurality of secondary power-supplying coils 22a, 22b, and 22c are supported by the plurality of second machines 30a, 30b, and 30c to be able to be wirelessly supplied with electric power from the primary power-supplying coils 21a, 21b, and 21c positioned above or below the secondary power-supplying coils 22a, 22b, and 22c, respectively.

The second machines 30a, 30b, and 30c are fixed to the framework 52 described later.

The second machines 30a, 30b, and 30c can be detachably attached to the framework 52 that will be described later, and the attitudes thereof can be adjusted.

A relative positional relationship or a relative attitudinal relationship between the first machines 10a, 10b, and 10c and the second machines 30a, 30b, and 30c can be adjusted so that a state in which electric power is wirelessly supplied from the primary power-supplying coils 21a, 21b, and 21c to the secondary power-supplying coils 22a, 22b, and 22c to correspond to the movement or change in attitude of the second machines 30a, 30b, and 30c is maintained.

The relative positional relationship between the plurality of first machines 10a, 10b, and 10c and the plurality of second machines 30a, 30b, and 30c can be adjusted so that the plurality of primary power-supplying coils 21a, 21b, and 21c are positioned below or above the plurality of secondary power-supplying coils 22a, 22b, and 22c to correspond to the movement of the plurality of second machines 30a, 30b, and 30c.

Electric power is wirelessly supplied from the plurality of primary power-supplying coils 21a, 21b, and 21c to the plurality of secondary power-supplying coils 21a, 21b, and 21c, respectively, and the wirelessly supplied electric power is supplied to the plurality of load devices 31a, 31b, and 31c of the plurality of second machines 30a, 30b, and 30c, respectively.

FIG. 2 illustrates a state in which the relative positional relationship between the plurality of first machines 10a, 10b, and 10c and the plurality of second machines 30a, 30b, and 30c can be adjusted so that the plurality of primary power-supplying coils 21a, 21b, and 21c are positioned below the plurality of secondary power-supplying coils 22a, 22b, and 22c, respectively, to correspond to the movement of the plurality of second machines 30a, 30b, and 30c, and in which electric power is wirelessly supplied from the plurality of primary power-supplying coils 21a, 21b, and 21c to the plurality of secondary power-supplying coils 22a, 22b, and 22c, respectively, and the wirelessly supplied electric power is supplied to the plurality of load devices 31a, 31b, and 31c of the plurality of second machines 30a, 30b, and 30c, respectively.

The plurality of second machines 30a, 30b, and 30c can be detached from the framework 52 and attached to the framework 52, and the plurality of second machines 30a, 30b, and 30c can be moved.

The plurality of first machines 10a, 10b, and 10c can be detached from the framework 51 and attached to the framework 51 to adjust the attitudes thereof, and the relative positional relationships between the plurality of first machines 10a, 10b, and 10c and the plurality of second machines 30a, 30b, and 30c can be adjusted so that the plurality of primary power-supplying coils 21a, 21b, and 21c are positioned below the plurality of secondary power-supplying coils 22a, 22b, and 22c, respectively.

The driving circuits 23a, 23b, and 23c and the power supply device 40 are the same as those of the wireless power supply system according to the above-described embodiment of the present disclosure, and the description thereof will not be provided.

The framework 51 is a structure to which the first machines 10a, 10b, and 10c can be detachably attached.

The framework 52 is a structure to which the second machines 30a, 30b, and 30c can be detachably attached.

For example, the frameworks 51 and 52 are installed in a studio or the like.

Next, a wireless power supply system according to a third embodiment of the present disclosure will be described based on the drawings.

Figure 3:
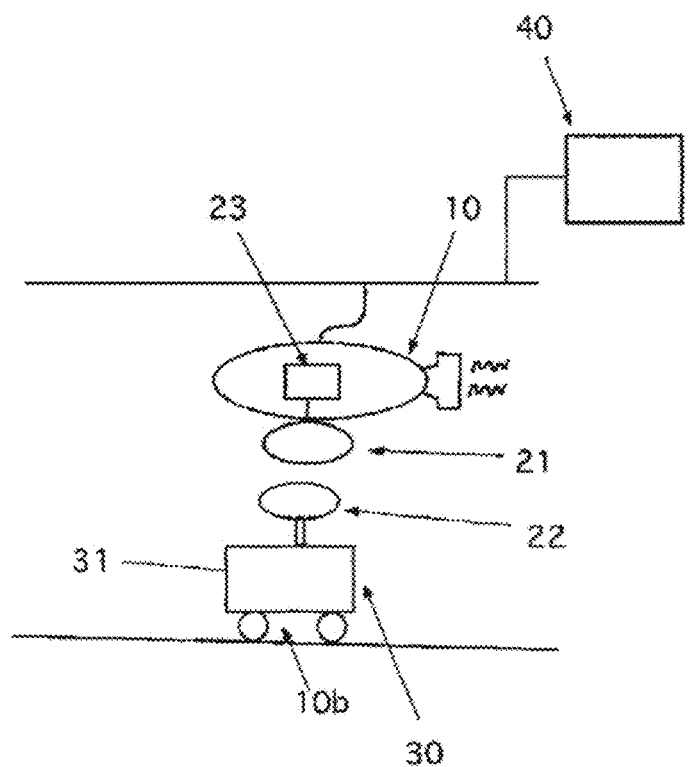
FIG. 3 is a conceptual diagram of a wireless power supply system according to a third embodiment of the present disclosure.

FIG. 3 is a conceptual diagram of a wireless power supply system according to an embodiment of the present disclosure.

The wireless power supply system according to the third embodiment of the present disclosure is a system which utilizes wireless power transmission.

For example, in a wireless power supply system, electric power output by a power supply device 40 is wirelessly supplied from a primary power-supplying coil 21 driven by a driving circuit (not illustrated) to a secondary power-supplying coil 22 and the wirelessly supplied electric power is supplied to a load device (not illustrated).

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from a primary power-supplying coil positioned above the secondary power-supplying coil 22.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The driving circuit 23 may be included in the first machine 10.

The power supply device 40 may be disposed outside the first machine 10.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 is a movable object that can move in the air in a horizontal direction.

For example, the first machine 10 is a floating object that can move in the air in a horizontal direction.

The primary power-supplying coil 21 is supported by a floating object to be able to wirelessly supply electric power to another power-supplying coil positioned immediately below the primary power-supplying coil 21.

The primary power-supplying coil 21 is supported by a floating object to be able to wirelessly supply electric power to the secondary power-supplying coil 22 positioned immediately below the primary power-supplying coil 21.

The secondary power-supplying coil is a power-supplying coil that is wirelessly supplied with electric power from another power-supplying coil.

The second machine 30 can move while supporting the secondary power-supplying coil 22.

The second machine 30 is a traveling object that travels in horizontal directions while steering its route.

For example, the second machine 30 is an AGV that travels in horizontal directions while steering its route.

The secondary power-supplying coil 22 is supported by a traveling object to be able to be wirelessly supplied with electric power from another power-supplying coil positioned immediately above the secondary power-supplying coil 22.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The movable object moves in horizontal directions according to the travel of the traveling object so that the movable object is positioned immediately above the traveling object to correspond to the travel of the traveling object.

FIG. 3 illustrates a state in which a floating object that is supplied with electric power from the power supply device 40 via a trolley line moves in horizontal directions according to the travel of an AGV so that the floating object is positioned immediately above the AGV to correspond to the travel of the AGV.

For example, the floating object detects the position of an AGV with the aid of a sensor (not illustrated) and moves in horizontal directions according to the travel of the AGV so that the floating object is positioned immediately above the AGV to correspond to the travel of the AGV.

Next, a wireless power supply system according to a fourth embodiment of the present disclosure will be described based on the drawings.

Figure 4:
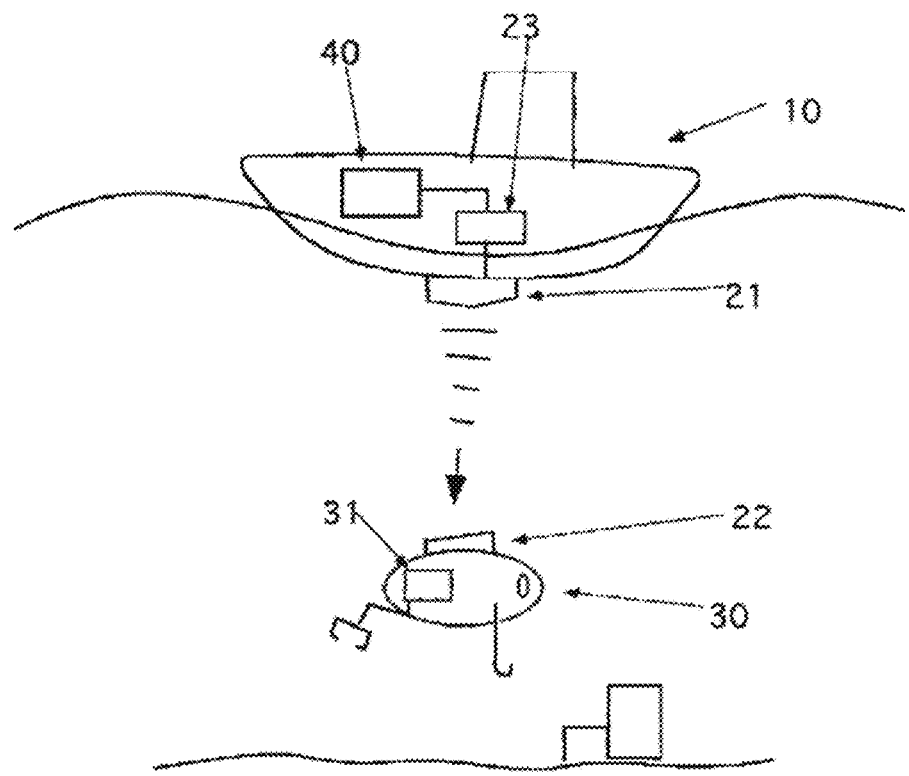
FIG. 4 is a conceptual diagram of a wireless power supply system according to a fourth embodiment of the present disclosure.

FIG. 4 is a conceptual diagram of a wireless power supply system according to a fourth embodiment of the present disclosure.

The wireless power supply system according to the fourth embodiment of the present disclosure is a system which utilizes wireless power transmission.

For example, in a wireless power supply system, electric power output by a power supply device 40 is wirelessly supplied from a primary power-supplying coil 21 driven by a driving circuit 23 to a secondary power-supplying coil 22 and the wirelessly supplied electric power is supplied to a load device.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

The secondary power-supplying coil 22 is wirelessly supplied with electric power from the primary power-supplying coil 21 positioned above the secondary power-supplying coil 22.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

For example, the driving circuit 23 and the power supply device 40 are included in the first machine 10.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 is a vessel that moves on a water surface.

The primary power-supplying coil 21 is supported by a vessel to be able to wirelessly supply electric power to another power-supplying coil positioned immediately below the primary power-supplying coil 21.

The primary power-supplying coil 21 is supported by a vessel to be able to wirelessly supply electric power to the secondary power-supplying coil 22 positioned immediately below the primary power-supplying coil 21.

The secondary power-supplying coil is a power-supplying coil that is wirelessly supplied with electric power from another power-supplying coil.

The secondary power-supplying coil is wirelessly supplied with electric power from the primary power-supplying coil 21.

The second machine 30 can move while supporting the secondary power-supplying coil 22.

The second machine 30 may support a load device that consumes electric power supplied to the secondary power-supplying coil 22.

The second machine 30 may be an underwater movable object that moves underwater.

For example, the second machine 30 may be an underwater sailing object that moves underwater.

For example, the second machine 30 may be a submarine or a submersible vessel that moves underwater.

The secondary power-supplying coil 22 is supported by an underwater movable object to be able to be wirelessly supplied with electric power from another power-supplying coil positioned immediately above the secondary power-supplying coil 22.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The vessel moves on the water surface according to the movement of the underwater movable object so that the vessel is positioned immediately above the underwater movable object.

FIG. 4 illustrates a state in which a vessel moves on the water surface according to the movement of an underwater movable object so that the vessel is positioned immediately above the underwater movable object.

The vessel moves on the water surface according to the movement of the underwater movable object to be positioned immediately above the underwater movable object, and the underwater movable object is driven with the electric power wirelessly supplied from the primary power-supplying coil 21 to the secondary power-supplying coil 22.

The vessel detects the position of the underwater movable object with the aid of a sensor (not illustrated) and moves on the water surface according to the movement of the underwater movable object to be positioned immediately above the underwater movable object, and the underwater movable object is driven with the electric power wirelessly supplied from the primary power-supplying coil 21 to the secondary power-supplying coil 22.

The driving circuit 23 and the power supply device 40 are the same as those of the wireless power supply system according to the above-described embodiment of the present disclosure, and the description thereof will not be provided.

Next, a wireless power supply system according to a fifth embodiment of the present disclosure will be described based on the drawings.

Figure 5:
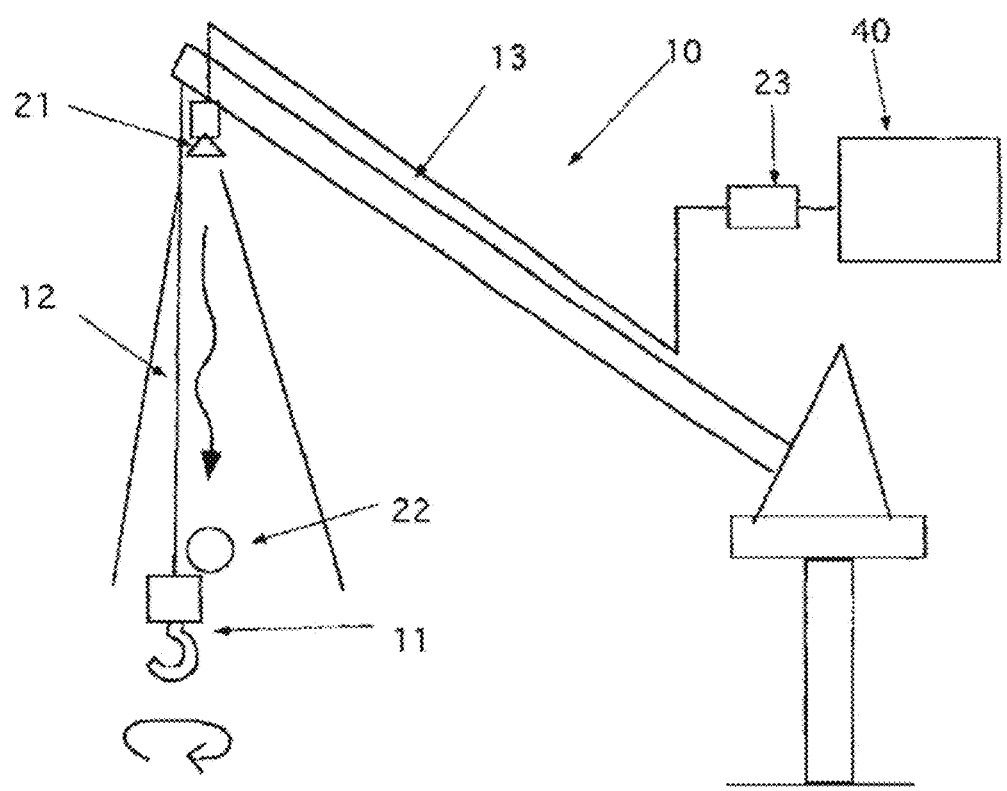
FIG. 5 is a conceptual diagram of a wireless power supply system according to a fifth embodiment of the present disclosure.

FIG. 5 is a conceptual diagram of a wireless power supply system according to the fifth embodiment of the present disclosure.

The wireless power supply system according to the fifth embodiment of the present disclosure is a system which utilizes wireless power transmission.

For example, in a wireless power supply system, electric power output by a power supply device is wirelessly supplied from a primary power-supplying coil 21 driven by a driving circuit to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 is a crane that lowers a lifting tool 11 with the aid of a cable 12.

The cable 12 hangs from the apex of a crane body 13 and the lifting tool 11 is supported at the lower end of the cable 12.

The primary power-supplying coil 21 is supported by the crane to be able to wirelessly supply electric power to another power-supplying coil positioned immediately below the primary power-supplying coil 21.

The primary power-supplying coil 21 is supported by the crane to be able to wirelessly supply electric power to the secondary power-supplying coil 22 positioned immediately below the primary power-supplying coil 21.

The primary power-supplying coil 21 is supported at the apex of the crane body 13.

The secondary power-supplying coil 22 is a power-supplying coil that is wirelessly supplied with electric power from another power-supplying coil.

The secondary power-supplying coil is wirelessly supplied with electric power from the primary power-supplying coil 21.

The second machine 30 can move while supporting the secondary power-supplying coil.

The second machine 30 may support the load device 31 that consumes electric power supplied to the secondary power-supplying coil.

The second machine 30 is supported by the lifting tool 11.

The secondary power-supplying coil 22 is supported by the second machine 30 to be able to be wirelessly supplied with electric power from another power-supplying coil positioned immediately above the secondary power-supplying coil 22.

The secondary power-supplying coil 22 is supported by the second machine 30 to be able to be wirelessly supplied with electric power from the primary power-supplying coil 21 positioned immediately above the secondary power-supplying coil 22.

For example, the second machine is a machine that is fixed to the lifting tool 11 to rotate a hook about the vertical axis.

For example, the second machine is a machine included in a load suspended from the lifting tool 11.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

Electric power is wirelessly supplied from the primary power-supplying coil 21 to the secondary power-supplying coil 22 during the use of the crane.

Electric power is wirelessly supplied from the primary power-supplying coil 21 to the secondary power-supplying coil 22 during the use of the crane and the electric power wirelessly supplied from the primary power-supplying coil 21 to the secondary power-supplying coil 22 is supplied to the load device 31 supported by the lifting tool 11.

The driving circuit 23 and the power supply device 40 are the same as those of the wireless power supply system according to the above-described embodiment of the present disclosure, and the description thereof will not be provided.

Next, a wireless power supply system according to a sixth embodiment of the present disclosure will be described based on the drawings.

Figure 6:
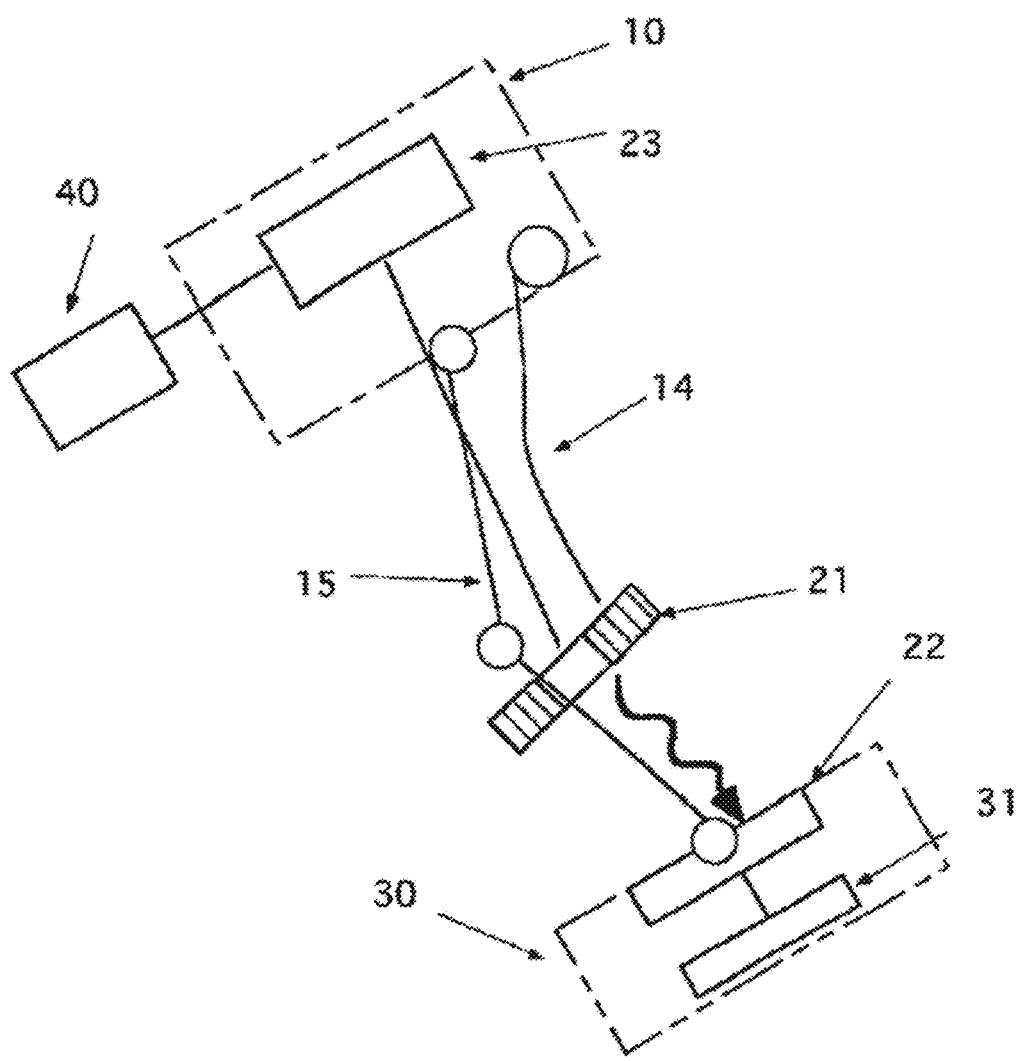
FIG. 6 is a conceptual diagram of a wireless power supply system according to a sixth embodiment of the present disclosure.

FIG. 6 is a conceptual diagram of a wireless power supply system according to the sixth embodiment of the present disclosure.

The wireless power supply system according to the sixth embodiment of the present disclosure is a system which utilizes wireless power transmission.

For example, in a wireless power supply system, electric power output by a power supply device 40 is wirelessly supplied from a primary power-supplying coil 21 driven by a driving circuit 23 to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 includes a first machine body and a connecting member 15.

The connecting member 15 connects the first machine body and the second machine 30.

For example, the connecting member 15 is a link mechanism that connects the first machine body and the second machine.

The primary power-supplying coil 21 is guided to freely move with the connecting member 15.

The primary power-supplying coil 21 is guided to freely move with the connecting member 15 between the first machine 10 and the second machine 30.

The secondary power-supplying coil 22 is a power-supplying coil that is wirelessly supplied with electric power from another power-supplying coil.

The secondary power-supplying coil 22 is wirelessly supplied with electric power from the primary power-supplying coil 21.

The second machine 30 can move while supporting the secondary power-supplying coil 22.

The second machine 30 may support the load device 31 that consumes electric power supplied to the secondary power-supplying coil 22.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The primary power-supplying coil 21 is moved with the connecting member 15 so that electric power can be wirelessly supplied from the primary power-supplying coil 21 to the secondary power-supplying coil 22.

The primary power-supplying coil 21 is moved with the connecting member 15 so that electric power can be wirelessly supplied from the primary power-supplying coil 21 to the secondary power-supplying coil 22, and the electric power wirelessly supplied from the primary power-supplying coil 21 to the secondary power-supplying coil 22 is supplied to the load device 31.

The first machine 10 causes the primary power-supplying coil 21 to move with the connecting member 15 so that electric power can be wirelessly supplied from the primary power-supplying coil 21 to the secondary power-supplying coil 22.

The first machine 10 causes the primary power-supplying coil 21 to move with the connecting member 15 with the aid of a moving mechanism 14 so that electric power can be wirelessly supplied from the primary power-supplying coil 21 to the secondary power-supplying coil 22.

The driving circuit 23 and the power supply device 40 are the same as those of the wireless power supply system according to the above-described embodiment of the present disclosure, and the description thereof will not be provided.

Next, a wireless power supply system according to a seventh embodiment of the present disclosure will be described based on the drawings.

Figure 7:
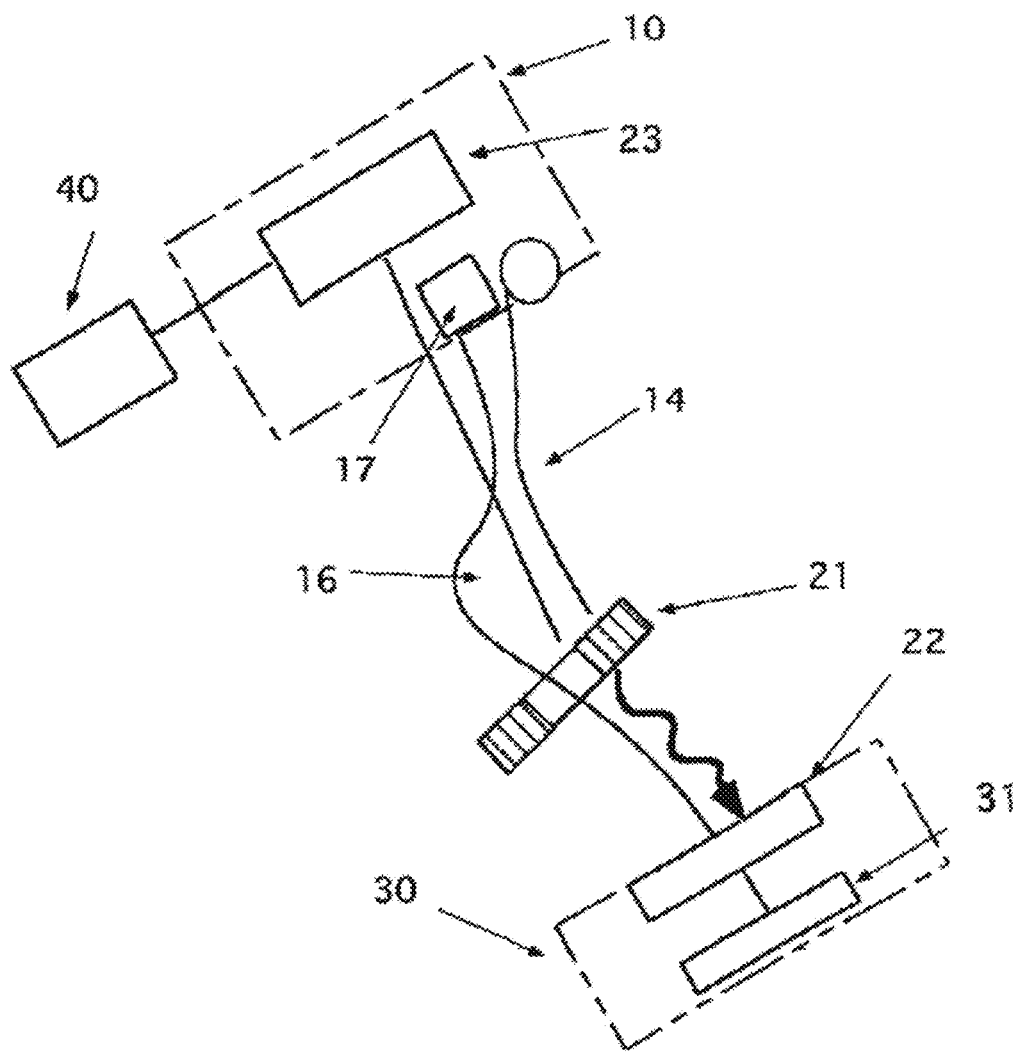
FIG. 7 is a conceptual diagram of a wireless power supply system according to a seventh embodiment of the present disclosure.

FIG. 7 is a conceptual diagram of a wireless power supply system according to the seventh embodiment of the present disclosure.

The wireless power supply system according to the seventh embodiment of the present disclosure is a system which utilizes wireless power transmission.

For example, in a wireless power supply system, electric power output by a power supply device 40 is wirelessly supplied from a primary power-supplying coil 21 driven by a driving circuit 23 to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil.

The first machine 10 supports the primary power-supplying coil 21.

The first machine 10 includes a first machine body and a rope 16.

The rope 16 can connect the first machine body and the second machine and can be reeled in and out.

For example, the rope 16 is a cable that connects the first machine body and the second machine.

A reel-out/in device 17 is a device that reels the rope 16 in and out.

When the reel-out/in device 17 reels the rope 16 out, the distance between the first machine 10 and the second machine 30 increases.

When the reel-out/in device 17 reels the rope 16 in, the distance between the first machine 10 and the second machine 30 decreases.

The primary power-supplying coil 21 is guided to freely move with the rope 16.

The primary power-supplying coil 21 is guided to freely move with the rope 16 between the first machine 10 and the second machine 30.

The secondary power-supplying coil is a power-supplying coil that is wirelessly supplied with electric power from another power-supplying coil.

The secondary power-supplying coil 22 is wirelessly supplied with electric power from the primary power-supplying coil 21.

The second machine 30 can move while supporting the secondary power-supplying coil 22.

The second machine 30 may support the load device 31 that consumes electric power supplied to the secondary power-supplying coil 22.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The primary power-supplying coil 21 is moved with the rope 16 so that electric power can be wirelessly supplied from the primary power-supplying coil 21 to the secondary power-supplying coil 22.

The primary power-supplying coil 21 is moved with the rope 16 so that electric power can be wirelessly supplied from the primary power-supplying coil 21 to the secondary power-supplying coil 22, and the electric power wirelessly supplied from the primary power-supplying coil 21 to the primary power-supplying coil 22 is supplied to the load device 31.

The first machine 10 causes the primary power-supplying coil 21 to move with the rope 16 so that electric power can be supplied from the primary power-supplying coil 21 to the secondary power-supplying coil 22.

The first machine 10 causes the primary power-supplying coil 21 to move with the rope 16 with the aid of a moving mechanism 14 so that electric power can be wirelessly supplied from the primary power-supplying coil 21 to the secondary power-supplying coil 22.

The driving circuit 23 and the power supply device 40 are the same as those of the wireless power supply system according to the above-described embodiment of the present disclosure, and the description thereof will not be provided.

Next, a wireless power supply system according to an eighth embodiment of the present disclosure will be described based on the drawings.

Figure 8:
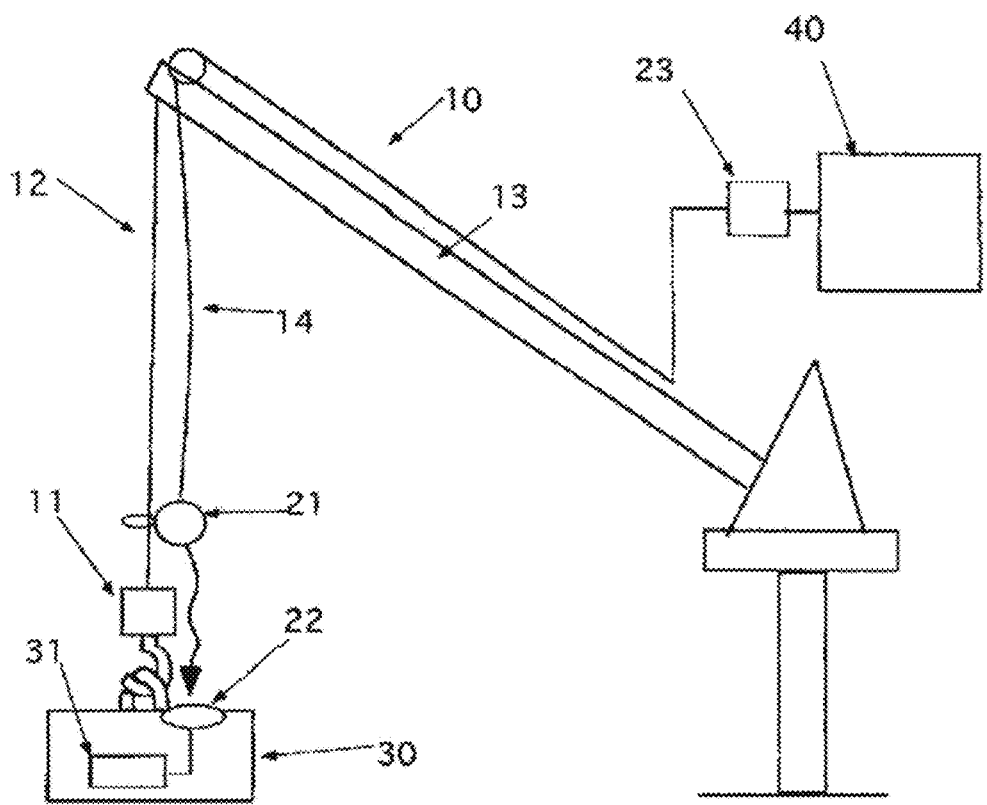
FIG. 8 is a conceptual diagram of a wireless power supply system according to an eighth embodiment of the present disclosure.

FIG. 8 is a conceptual diagram of a wireless power supply system according to the eighth embodiment of the present disclosure.

The wireless power supply system according to the eighth embodiment of the present disclosure is a system which utilizes wireless power transmission.

For example, in a wireless power supply system, electric power output by a power supply device is wirelessly supplied from a primary power-supplying coil 21 driven by a driving circuit to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 is a crane that lowers a lifting tool 11 with the aid of a cable 12.

The cable 12 hangs from the apex of a crane body 13 and the lifting tool 11 is supported at the lower end of the cable 12.

The primary power-supplying coil 21 is guided to freely move along the cable 12.

The moving mechanism 14 can cause the primary power-supplying coil 21 to move along the cable 12.

The moving mechanism 14 lowers the primary power-supplying coil 21 along the cable 12.

The moving mechanism 14 raises the primary power-supplying coil 21 along the cable 12.

The primary power-supplying coil 21 is guided to freely move along the cable 12 so that the primary power-supplying coil 21 can wirelessly supply electric power to the secondary power-supplying coil 22 positioned immediately below the primary power-supplying coil 21.

The secondary power-supplying coil 22 is a power-supplying coil that is wirelessly supplied with electric power from another power-supplying coil.

The secondary power-supplying coil 22 is wirelessly supplied with electric power from the primary power-supplying coil 21.

The second machine 30 can move while supporting the secondary power-supplying coil.

The second machine 30 may support the load device that consumes electric power supplied to the secondary power-supplying coil.

The second machine 30 is suspended from the lifting tool 11.

The secondary power-supplying coil 22 is supported by the second machine 30 suspended from the lifting tool to be able to be wirelessly supplied with electric power from another power-supplying coil positioned immediately above the secondary power-supplying coil 22.

The secondary power-supplying coil 22 is supported by the second machine 30 suspended from the lifting tool to be able to be wirelessly supplied with electric power from the primary power-supplying coil 21 positioned immediately above the secondary power-supplying coil 22.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The primary power-supplying coil 21 is moved along the cable 12 so that a state in which electric power is wirelessly supplied from the primary power-supplying coil 21 to the secondary power-supplying coil 22 is maintained.

The primary power-supplying coil 21 is moved along the cable 12 so that a state in which electric power is wirelessly supplied from the primary power-supplying coil 21 to the secondary power-supplying coil 22 is maintained, and the electric power wirelessly supplied from the primary power-supplying coil 21 to the secondary power-supplying coil 22 is supplied to the load device 31 of the second machine 30.

A crane moves the primary power-supplying coil 21 along the cable so that a state in which electric power is wirelessly supplied from the primary power-supplying coil 21 to the secondary power-supplying coil 22 can be maintained.

A crane moves the primary power-supplying coil 21 along the cable using the moving mechanism 14 so that a state in which electric power is wirelessly supplied from the primary power-supplying coil 21 to the secondary power-supplying coil 22 is maintained.

The driving circuit 23 and the power supply device 40 are the same as those of the wireless power supply system according to the above-described embodiment of the present disclosure, and the description thereof will not be provided.

Next, a wireless power supply system according to a ninth embodiment of the present disclosure will be described based on the drawings.

Figure 9:
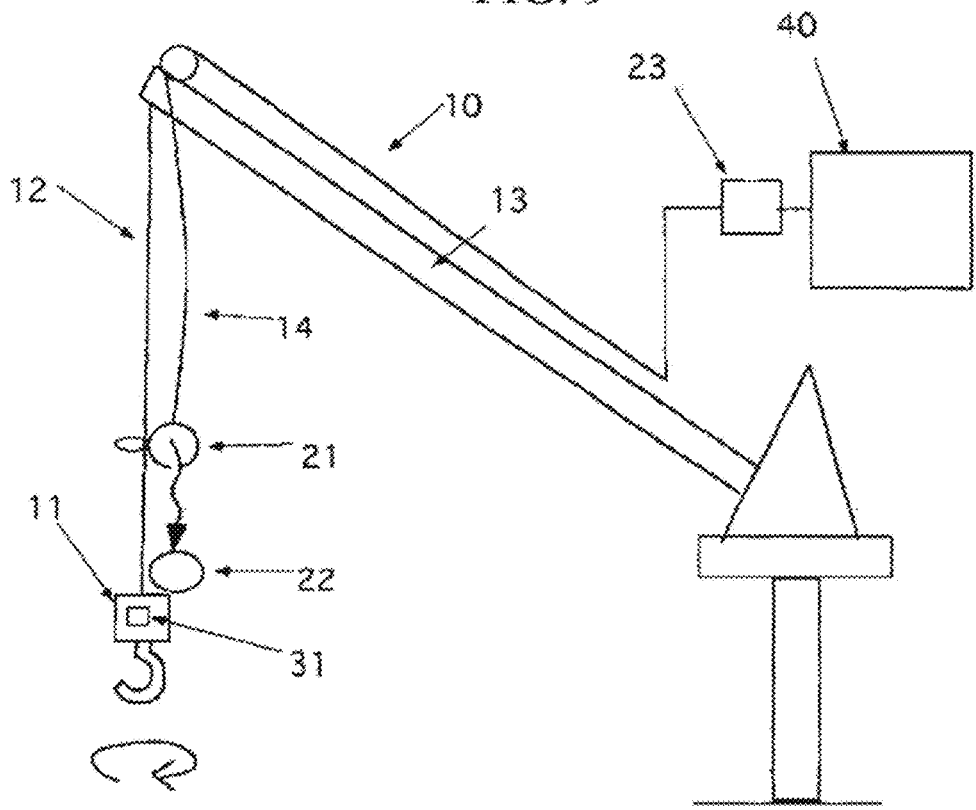
FIG. 9 is a conceptual diagram of a wireless power supply system according to a ninth embodiment of the present disclosure.

FIG. 9 is a conceptual diagram of a wireless power supply system according to the ninth embodiment of the present disclosure.

The wireless power supply system according to the ninth embodiment of the present disclosure is a system which utilizes wireless power transmission.

For example, in a wireless power supply system, electric power output by a power supply device is wirelessly supplied from a primary power-supplying coil 21 driven by a driving circuit to a secondary power-supplying coil 22 and the wirelessly supplied electric power is supplied to a load device 31.

When a current flows into the primary power-supplying coil 21, a magnetic field is generated in a space to induce a current in the secondary power-supplying coil 22 present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes the primary power-supplying coil 21, a first machine 10, the secondary power-supplying coil 22, and a second machine 30.

The wireless power supply system according to the embodiment of the present disclosure may include the primary power-supplying coil 21, the first machine 10, the secondary power-supplying coil 22, the second machine 30, and a driving circuit 23 and may include the primary power-supplying coil 21, the first machine 10, the secondary power-supplying coil 22, the second machine 30, the driving circuit 23, and the power supply device 40.

The primary power-supplying coil 21 is a power-supplying coil that can wirelessly supply electric power to another power-supplying coil.

The primary power-supplying coil 21 can wirelessly supply electric power to the secondary power-supplying coil 22.

The first machine 10 supports the primary power-supplying coil 21.

The first machine 10 is a crane that lowers a lifting tool 11 with the aid of a cable 12.

The cable 12 hangs from the apex of a crane body 13 and the lifting tool 11 is supported at the lower end of the cable 12.

The primary power-supplying coil 21 is guided to freely move along the cable 12 so that electric power can be wirelessly supplied to another power-supplying coil positioned immediately below the primary power-supplying coil 21.

The primary power-supplying coil 21 is guided to freely move along the cable 12 so that electric power can be wirelessly supplied to the primary power-supplying coil 21 positioned immediately below the primary power-supplying coil 21.

The moving mechanism 14 hoists the primary power-supplying coil 21.

The moving mechanism 14 lowers the primary power-supplying coil 21 along the cable 12.

The moving mechanism 14 raises the primary power-supplying coil 21 along the cable 12.

The secondary power-supplying coil 22 is a power-supplying coil that is wirelessly supplied with electric power from another power-supplying coil.

The secondary power-supplying coil 22 is wirelessly supplied with electric power from the primary power-supplying coil 21.

The second machine 30 can move while supporting the secondary power-supplying coil.

The second machine 30 may support the load device that consumes electric power supplied to the secondary power-supplying coil.

The second machine 30 is supported by the lifting tool 11.

The secondary power-supplying coil 22 is supported by the second machine 30 to be able to be wirelessly supplied with electric power from another power-supplying coil positioned immediately above the secondary power-supplying coil 22.

The secondary power-supplying coil 22 is supported by the second machine 30 to be able to be wirelessly supplied with electric power from the primary power-supplying coil 21 positioned immediately above the secondary power-supplying coil 22.

For example, the second machine may be a machine that is fixed to the lifting tool 11 to rotate a hook about the vertical axis.

For example, the second machine may be a machine included in a load suspended from the lifting tool 11.

A relative positional relationship or a relative attitudinal relationship between the first machine 10 and the second machine 30 can be adjusted so that a state in which electric power is wirelessly supplied from the primary power-supplying coil 21 to the secondary power-supplying coil 22 to correspond to the movement or the change in attitude of the second machine 30 is maintained.

The primary power-supplying coil 21 is moved along the cable so that a state in which electric power is wirelessly supplied from the primary power-supplying coil 21 to the secondary power-supplying coil 22 is maintained.

The second machine 30 causes the hook to rotate about the vertical axis with the electric power wirelessly supplied from the primary power-supplying coil 21 to the secondary power-supplying coil 22.

A crane moves the primary power-supplying coil 21 along the cable so that a state in which electric power is wirelessly supplied from the primary power-supplying coil 21 to the secondary power-supplying coil 22 is maintained, and the second machine 30 causes the hook to rotate about the vertical axis with the electric power wirelessly supplied from the primary power-supplying coil 21 to the secondary power-supplying coil 22.

The driving circuit 23 and the power supply device 40 are the same as those of the wireless power supply system according to the above-described embodiment of the present disclosure, and the description thereof will not be provided.

Next, a wireless power supply system according to a tenth embodiment of the present disclosure will be described based on the drawings.

Figure 10:
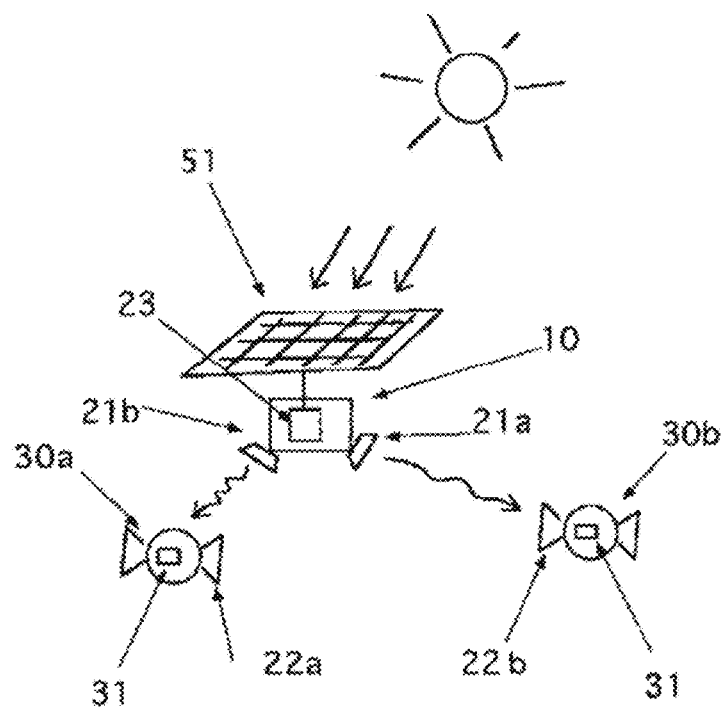
FIG. 10 is a conceptual diagram of a wireless power supply system according to a tenth embodiment of the present disclosure.
Figure 11A:
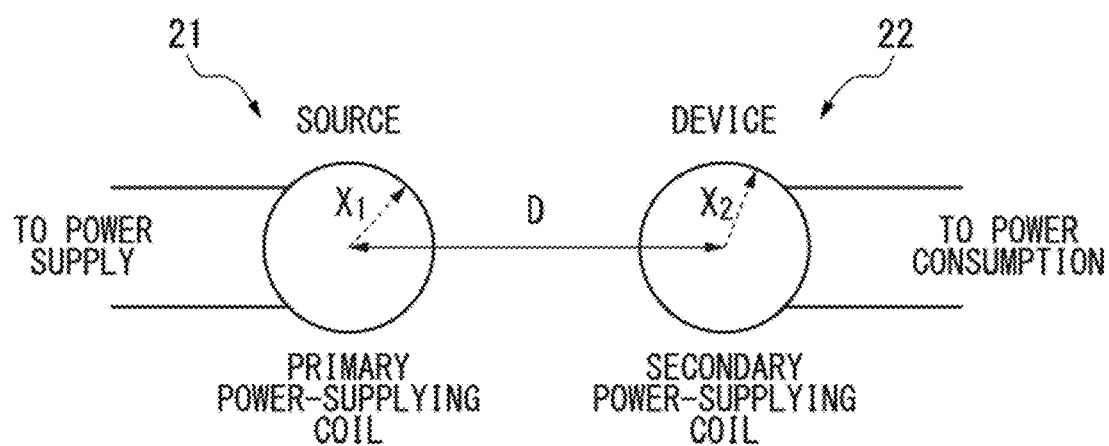
FIG. 11A is a conceptual diagram of a wireless power supply system.
Figure 11B:
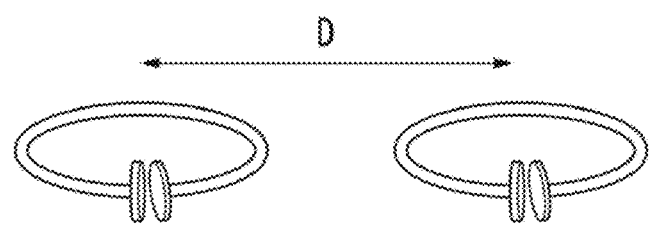
FIG. 11B is a conceptual diagram of a wireless power supply system.

FIG. 10 is a conceptual diagram of a wireless power supply system according to the tenth embodiment of the present disclosure.

The wireless power supply system according to the embodiment of the present disclosure is a system which utilizes wireless power transmission.

For example, in a wireless power supply system, electric power output by a power supply device 40 is wirelessly supplied from a primary power-supplying coil 21 driven by a driving circuit 23 to a secondary power-supplying coil 22 and the wirelessly supplied electric power is supplied to a load device 31.

When a current flows into the primary power-supplying coil 21, a magnetic field is generated in a space to induce a current in the secondary power-supplying coil present in the magnetic field.

For example, when an AC current flows into the primary power-supplying coil 21, a magnetic field is generated in the space to induce a current in the secondary power-supplying coil 22 present in the magnetic field.

As a result, the secondary power-supplying coil 22 is wirelessly supplied with electric power from the primary power-supplying coil 21.

For example, the secondary power-supplying coil 22 is wirelessly supplied with electric power from the primary power-supplying coil 21 according to magnetic field resonance, electric field resonance, or electromagnetic induction.

The wireless power supply system according to the embodiment of the present disclosure includes a plurality of primary power-supplying coils 21a and 21b, a first machine 10, a plurality of secondary power-supplying coils 22a and 22b, and a plurality of second machines 30a and 30b.

The wireless power supply system according to the embodiment of the present disclosure may include the plurality of primary power-supplying coils 21a and 21b, the first machine 10, the plurality of secondary power-supplying coils 22a and 22b, the plurality of second machines 30a and 30b, and a driving circuit 23 and may include the plurality of primary power-supplying coils 21a and 21b, the first machine 10, the plurality of secondary power-supplying coils 22a and 22b, the plurality of second machines 30a and 30b, the driving circuit 23, and a photovoltaic battery 41.

The primary power-supplying coils 21a and 21b are power-supplying coils that can wirelessly supply electric power to another power-supplying coil.

The primary power-supplying coils 21a and 21b can wirelessly supply electric power to the secondary power-supplying coil 22.

The first machine supports the plurality of primary power-supplying coils 21a and 21b and the photovoltaic battery 41.

The photovoltaic battery 41 is an electric element which generates electric power from sunlight received on a light-receiving surface and outputs the generated electric power.

The photovoltaic battery 41 generates electric power from the sunlight received on the light-receiving surface and supplies the generated electric power to the plurality of primary power-supplying coils 21a and 21b.

For example, the first machine is an artificial satellite.

The secondary power-supplying coils 22a and 22b are power-supplying coils that are wirelessly supplied with electric power from another power-supplying coil.

The secondary power-supplying coil 22a and 22b are wirelessly supplied with electric power from the primary power-supplying coils 21a and 21b, respectively.

The second machines 30a and 30b can move while supporting the secondary power-supplying coils 22a and 22b, respectively.

The second machines 30a and 30b may support load devices that consume electric power supplied to the secondary power-supplying coils 22a and 22b, respectively.

For example, the second machines 30a and 30b are subordinate satellites.

The plurality of second machines 30a and 30b may be disposed on the opposite side from the light-receiving surface facing the sun.

A relative positional relationship or a relative attitudinal relationship between the first machine 10 and the second machine 30 can be adjusted so that a state in which electric power is wirelessly supplied from the primary power-supplying coils 21a and 21b to the secondary power-supplying coils 22a and 22b to correspond to the movement or the change in attitude of the second machine 30 is maintained.

The attitudes of the plurality of primary power-supplying coils 21a and 21b are changed according to the movement of the plurality of second machines 30 so that a state in which the light-receiving surface of the photovoltaic battery 41 faces the sun and the electric power generated by the photovoltaic battery 41 is wirelessly supplied from the plurality of primary power-supplying coils 21a and 21b to the plurality of secondary power-supplying coils 22a and 22b, respectively, to correspond to the movement or change in attitudes of the second machines 30 is maintained.

The first machine 10 may change the attitudes of the plurality of primary power-supplying coils 21a and 21b according to the movement of the plurality of second machines 30 so that a state in which the light-receiving surface of the photovoltaic battery 41 faces the sun and the electric power generated by the photovoltaic battery 41 is wirelessly supplied from the plurality of primary power-supplying coils 21a and 21b to the plurality of secondary power-supplying coils 22a and 22b, respectively, to correspond to the movement or change in attitudes of the second machines 30 is maintained.

Due to the configuration, the wireless power supply systems according to the embodiments of the present disclosure provide the following effects.

The relative positional relationship or the attitudinal relationship between the first machine 10 and the second machine 30 can be adjusted so that a state in which electric power is wirelessly supplied from the primary power-supplying coil 21 to the secondary power-supplying coil 22 to correspond to the movement of the first machine 10 moving while supporting the primary power-supplying coil 21 is maintained. Thus, it is possible to supply electric power from the first machine 10 to the moving second machine 30.

Moreover, the position or attitude of the primary power-supplying coil 21 is changed according to the movement of the second machine 30 that supports the secondary power-supplying coil 22 so that a state in which the first machine 10 supports the primary power-supplying coil 21 and electric power is wirelessly supplied from the primary power-supplying coil 21 to the secondary power-supplying coil 22 is maintained. Thus, it is possible to supply electric power from the first machine 10 to the moving second machine 30.

Further, when the position of the primary power-supplying coil 21 supported by the first machine 10 and the position of the secondary power-supplying coil 22 supported by the second machine 30 are in a vertical relationship, electric power can be wirelessly supplied. Moreover, the primary power-supplying coil 21 and the secondary power-supplying coil 22 can be positioned in a vertical relationship by adjusting the relative positional relationship between the first machine 10 and the second machine 30. Thus, it is possible to supply electric power from the first machine 10 to the moving second machine 30.

Further, when the positions of the plurality of primary power-supplying coils 21a, 21b, and 21c supported by the plurality of first machines 10a, 10b, and 10c, respectively, and the positions of the plurality of secondary power-supplying coils 22a, 22b, and 22c supported by the plurality of second machines 30 are in a vertical relationship, electric power can be wirelessly supplied to the respective coils. Moreover, the plurality of primary power-supplying coils 21a, 21b, and 21c and the plurality of secondary power-supplying coils 22a, 22b, and 22c can be positioned in a vertical relationship by adjusting the relative positional relationship between the plurality of first machines 10a, 10b, and 10c and the plurality of second machines 30a, 30b, and 30c. Thus, it is possible to supply electric power from the plurality of first machines 10a, 10b, and 10c to the plurality of second machines 30a, 30b, and 30c, respectively, and to supply electric power to the load devices 31 supported by the plurality of second machines 30a, 30b, and 30c.

Further, when the position of the primary power-supplying coil 21 supported by a movable object that can move in the air and the position of the secondary power-supplying coil 22 supported by a traveling object that travels along a route are in a vertical relationship, electric power can be wirelessly supplied. Moreover, the movable object can move in the horizontal direction according to the travel of the traveling object to be positioned immediately above the traveling object to correspond to the travel of the traveling object so that the primary power-supplying coil 21 and the secondary power-supplying coil 22 are positioned in a vertical relationship. Thus, it is possible to supply electric power from the movable object to the moving traveling object.

Moreover, when the position of the primary power-supplying coil 21 supported by a vessel that can move on a water surface and the position of the secondary power-supplying coil 22 supported by an underwater movable object that moves underwater are in a vertical relationship, electric power can be wirelessly supplied. Moreover, the vessel can move in horizontal directions according to the travel of the underwater movable object to be positioned immediately above the underwater movable object to correspond to the travel of the underwater movable object so that the primary power-supplying coil 21 and the secondary power-supplying coil 22 can be positioned in a vertical relationship. Thus, it is possible to supply electric power from the vessel to the moving underwater movable object.

Further, electric power can be wirelessly supplied when the position of the primary power-supplying coil 21 supported by a crane and the position of the secondary power-supplying coil 22 supported by the first machine 10 that is supported by a lifting tool of the crane. Thus, it is possible to supply electric power to the second machine 30 supported by the lifting tool during the use of the crane.

Further, the primary power-supplying coil 21 is guided to freely move with the connecting member 15 that connects the first machine and the second machine, and the primary power-supplying coil 21 is moved with the connecting member 15 so that electric power can be wirelessly supplied from the primary power-supplying coil 21 to the secondary power-supplying coil 22. Thus, it is possible to supply electric power from the first machine 10 to the moving second machine 30.

Further, the secondary power-supplying coil 22 is guided to freely move along the rope 16 that can connect the first machine 10 and the second machine 30 and can be reeled out or in, and the primary power-supplying coil 21 is moved along the rope 16 so that electric power can be wirelessly supplied from the primary power-supplying coil 21 to the secondary power-supplying coil 22. Thus, it is possible to supply electric power from the first machine 10 to the moving second machine 30.

Further, the secondary power-supplying coil 22 is guided to freely move along the cable 12 that hoists the lifting tool 11 of the crane and the primary power-supplying coil 21 is moved along the cable 12 so that a state in which electric power is wirelessly supplied from the primary power-supplying coil 21 to the secondary power-supplying coil 22 can be maintained. Thus, it is possible to supply electric power to the second machine 30 suspended from the lifting tool 11 that is lowered from the crane along the cable 12.

Further, the secondary power-supplying coil 22 is guided to freely move along the cable 12 that hoists the lifting tool 11 of the crane, the primary power-supplying coil 21 is moved along the cable 12 so that a state in which electric power is wirelessly supplied from the primary power-supplying coil 21 to the secondary power-supplying coil 22 is maintained, and the hook of the lifting tool 11 is rotated about the vertical axis with the wirelessly supplied electric power. Thus, it is possible to rotate the hook of the lifting tool 11 lowered from the crane along the cable 12 with the electric power supplied to the second machine 30.

Further, the first machine 10 changes the attitudes of the plurality of primary power-supplying coils 21a and 21b according to the movement of the plurality of second machines 30 so that a state in which the light-receiving surface of the photovoltaic battery 41 faces the sun and the electric power generated by the photovoltaic battery 41 can be wirelessly supplied from the plurality of primary power-supplying coils 21a and 21b to the plurality of secondary power-supplying coils 22a and 22b, respectively, is maintained. Thus, it is possible to supply the electric power generated by the photovoltaic battery 41 to the second machine 30.

The present disclosure is not limited to the embodiments described above and various changes can be made without departing from the spirit of the disclosure.

INDUSTRIAL APPLICABILITY

The present disclosure provides a wireless power supply system which has a simple structure and little energy loss and which can supply electric power in an easy-to-use manner.

The invention claimed is:

1. A wireless power supply system comprising:
a primary power-supplying coil which is a power-supplying coil configured to wirelessly supply electric power to another power-supplying coil;
a first machine supporting the primary power-supplying coil;
a secondary power-supplying coil which is a power-supplying coil wirelessly supplied with electric power from another power-supplying coil;
a second machine supporting the secondary power-supplying coil and configured to move; and
a reel-out/in device that reels the rope in and out,
wherein the first machine includes a first machine body and a rope that connects the first machine body and the second machine and is configured to be reeled out or reeled in,
wherein the primary power-supplying coil is moved with the rope, and a relative positional relationship between the first machine and the second machine is capable of being adjusted in response to a movement of the second machine such that a state in which electric power is wirelessly supplied from the primary power-supplying coil to the secondary power-supplying coil is maintained, and/or the primary power-supplying coil is moved with the rope, and a relative attitudinal relationship between the first machine and the second machine is capable of being adjusted in response to a change in attitude of the second machine such that a state in which electric power is wirelessly supplied from the primary power-supplying coil to the secondary power-supplying coil is maintained,
the primary power-supplying coil is guided to freely move along the rope such that the primary power-supplying coil moves between the first machine body and the second machine, and can move away from and approach the second machine, and
the primary power-supplying coil is moved along the rope to approach the second machine so that electric power is wirelessly supplied from the primary power-supplying coil to the secondary power-supplying coil supported by the second machine, and
wherein when the reel-out/in device reels the rope out, a distance between the first machine and the second machine increases, and
when the reel-out/in device reels the rope in, the distance between the first machine and the second machine decreases.

* * * * *